G. R. RIGGS.
VEHICLE WHEEL.
APPLICATION FILED AUG. 13, 1915. RENEWED DEC. 15, 1917.
1,271,366.
Patented July 2, 1918.
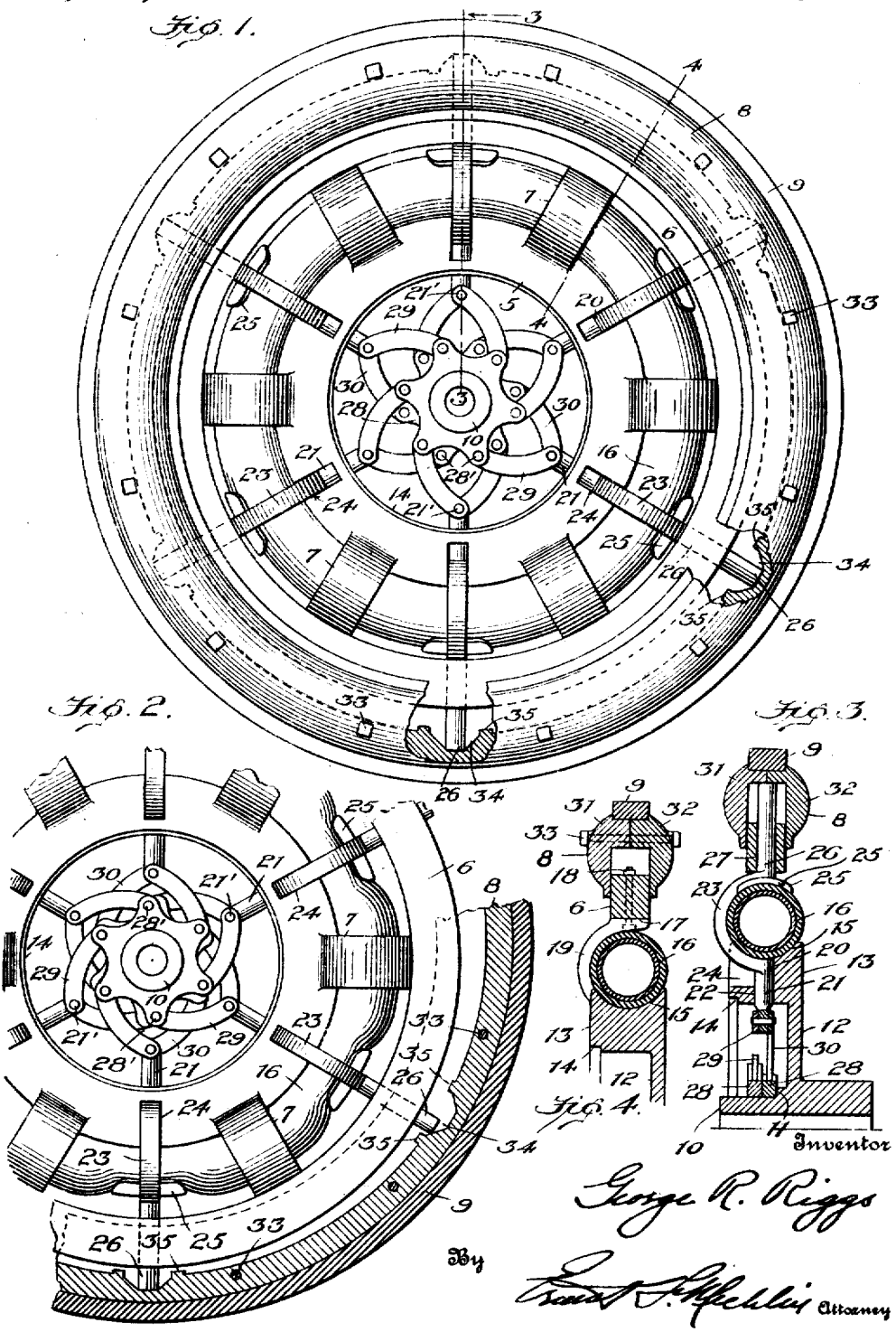

UNITED STATES PATENT OFFICE.

GEORGE R. RIGGS, OF WASHINGTON, DISTRICT OF COLUMBIA, ASSIGNOR OF ONE-HALF TO FERDINAND A. SCHAEFER, OF RASPEBURG, MARYLAND.

VEHICLE-WHEEL.

1,271,366.  Specification of Letters Patent.  Patented July 2, 1918.

Application filed August 13, 1915, Serial No. 45,275. Renewed December 15, 1917. Serial No. 207,358.

*To all whom it may concern:*

Be it known that I, GEORGE R. RIGGS, a citizen of the United States, residing at Washington, in the District of Columbia, have invented certain new and useful Improvements in Vehicle-Wheels; and I do hereby declare the following to be a full, clear, and exact description of the invention, such as will enable others skilled in the art to which it appertains to make and use the same.

This invention relates to vehicle wheels, and more particularly to wheels for motor propelled vehicles.

To this end, the main features of my invention, generally stated, consist in providing a vehicle wheel having a circumferentially arranged cushioning means in combination with a plurality of movable cushion actuating members adapted to bear at one extremity against a rim member and means mounted upon the hub member and so connected to the other extremity of each actuating member that a movement of one of the actuating members will produce a movement in a like direction of each and all of the other actuating members.

There are other features of my invention, as will appear from a more detailed description, taken in connection with the accompanying drawing chosen for the purpose of illustrating one form of the invention, wherein—

Figure 1, is a side elevation, partly in section, of a vehicle wheel, constructed in accordance with the invention.

Fig. 2 is a view similar to Fig. 1, showing the various parts in the position they assume under a load.

Figs. 3 and 4 are detached section views taken respectively on lines 3—3 and 4—4 of Fig. 1.

The vehicle wheel chosen for the purpose of illustrating one form of the invention comprises a hub portion 5, a felly 6, a plurality of curved spoke members 7, rigidly uniting the hub and felly and serving to hold the felly in spaced relation to the hub member, and preferably a rigid floating rim member, on the outer face of which may be mounted the tire member 9.

The hub member 5 preferably consists of a central spindle 10, which may be provided with a shoulder 11, as shown, the purpose of which will be hereinafter explained. Spaced from the spindle 10, and concentric therewith and preferably integrally connected thereto by the flange 12 is the outer hub member 13. On the inner face and near one edge, the said member 13 may be provided with a seat portion 14 adapted to receive a suitable cover or dust plate (not shown).

The outer face of the hub member 13 is preferably provided with a circumferential groove 15 adapted to form a seat for the cushioning device 16 which may be in the form of a pneumatic tire, it is to be understood, however, that other forms of cushioning devices may be substituted and the term tire is used only in the descriptive sense and not as a limitation.

To the outer hub member 13 are connected the spoke members 7, the said spoke members being rigidly connected to the hub member, in any desirable manner, the outer ends of the spoke members are rigidly united to the felly, one method being illustrated, in which the ends of the spoke members are provided with portions 17 adapted to engage the inner periphery of the felly and to be bolted thereto by the headed bolts 18.

Each of the spoke members 7 is provided with a curved portion 19 to enable the spoke members to partially embrace or inclose the cushioning member 16.

Located intermediate each pair of spoke members is a plunger member 20, the inner end 21 of each plunger being adapted to extend through a suitable opening 22 in the outer hub member 13. The plunger members 20 are preferably provided intermediate their ends with a curved or bowed portion 23 and in order to permit of an inward movement of the plunger members, the hub member 13 may be, and preferably is, provided adjacent the opening 22 with an outwardly open slot or groove 24.

The curved portion of the plunger member is adapted to partially embrace the cushioning member and each of the plunger members may be provided with a shoe 25 having a curved inner face 25', adapted to bear on the outer surface of the cushioning member. The outer end 26 of each plunger member extends through a suitable opening 27 in the felly and is adapted to contact with the inner face of the rim.

The means for connecting the cushioning actuating members is preferably located within the outer hub member 13 and includes relatively rotatable members which may for convenience be formed as sprocket-shaped members 28, these members being held in proper position on the spindle 10 by the shoulder 11 hereinbefore described; each member 28 is provided with a plurality of spaced points adjacent the periphery thereof, each of said points being preferably provided with a pivot pin 28'. Pivotally connected to the inner end 21 of each of the cushion actuating members 20 by the pivot pin 21' are a pair of oppositely extending and preferably rigid link members 29 and 30. One of the links, as for instance 30, being connected to one of the members 28 by the pivot pin 28' and the other link being connected to the other member 28 in a similar manner.

It will be evident from the foregoing description that the means of connecting the cushion actuating members to the hub, comprising the relatively rotatable members and the links produces in effect a toggle connection for each actuating member, the force always acting at the common pivot point of each pair of links and acting to increase their angular relation. It will also be evident that a force applied to one of the actuating members will spread the links connected thereto and thereby produce a relative rotation of the sprocket-shaped members and a movement in a radial direction of all of the other actuating members.

In order to prevent a relative rotation of the rim and hub members, pockets 34 are preferably provided in the inner face of the rim member, each pocket being adapted to receive the outer end 26 of one of the actuating members 20. These pockets are preferably provided with inclined side walls to permit of the normal operation of the device and are further provided adjacent the side walls thereof with upstanding lugs 35 adapted to engage the actuating members to prevent the same from passing entirely out of the pockets.

The rim member 8 is preferably made in two parts, united by a plurality of headed bolts 33.

The operation of the device will, it is believed, be clear from the foregoing description. It will be evident that a relative movement of the hub and rim will place one or more of the cushion actuating members under a compressive strain and cause an inward movement thereof, and as stated above an inward movement of one of these members will cause a relative rotation of the members 28 and an inward movement of all of the other cushion actuating members. This inward movement of the cushion actuating members is of course resisted by the cushioning means which is compressed equally at a number of places, equally spaced around the wheel.

It will thus be seen that I have produced a vehicle wheel, which while possessing none of the inherent defects of the pneumatic tired wheel is capable of using a pneumatic tire as the cushioning means and which protects the tire, if used, from all wear and tear and liability of puncture. The wheel possesses great strength and rigidity and is capable of withstanding the great strains to which motor vehicles are subjected.

It is to be understood that the foregoing description of one embodiment of the invention is merely illustrative, and not to be taken in a limiting sense, since what I claim and desire to secure by Letters Patent is:

1. In a wheel, the combination of a hub member, a rim member, annularly arranged cushioning means interposed between said hub and rim, and a plurality of means each adapted to operatively connect the said hub and rim, said connecting means being adapted on a relative displacement of said hub and rim to compress said cushioning means at a plurality of spaced points.

2. In a wheel, the combination of a rim member, a hub member, a plurality of spoke members, a circumferentially arranged cushioning element, a plurality of cushion actuating members, said members being spaced from said spoke members, toggle means connecting said actuating members and adapted on a radial displacement of said hub and rim members to cause a movement in unison of all of the actuating members.

3. In a wheel, the combination of a hub member, a rim member, a circumferentially annularly arranged cushion element, a plurality of cushion actuating members and means connected to said actuating members adapted on a radial displacement of one of said members to produce a movement in a like radial direction of all of the other actuating members.

4. In a wheel, a rim member, a hub member, having a seat for a cushioning element, a cushioning element therein, a plurality of cushion actuating members adapted to move radially to actuate said cushion, and means connected to said actuating members adapted on a radial displacement of one thereof to produce a displacement in a like direction of all of the other actuating members.

5. In a wheel, a rim member, a hub member, one of said members being provided with a seat for a pneumatic tire, a pneumatic tire therein, a plurality of movable members adapted to operatively connect said hub and rim, means connected to said movable members adapted on a positive movement of one of said members to produce a movement in unison of all of the other members, the said tire being adapted to yieldingly resist the movement of said members.

6. In a wheel, a hub member, a rim member, a felly, a plurality of movable members adapted to operatively connect said hub and rim, said hub being provided with an annularly arranged seat, a pneumatic tire therein, the said connecting members being adapted to engage said tire, and means connected to said movable members, adapted on an inward movement of one of said members to produce a simultaneous inward movement of all of the other of said members, the said tire being adapted to yieldingly resist the said inward movement of said connecting members.

7. In a wheel, the combination of a hub member, a rim member, annularly arranged cushioning means interposed between said hub and rim and a plurality of means connected to the hub member and each adapted during a portion of a revolution of said wheel to form a connection between said hub and said rim and adapted during another portion of a revolution of said wheel to be out of contact with said rim, substantially as described.

In testimony whereof I affix my signature.

GEORGE R. RIGGS.

Copies of this patent may be obtained for five cents each, by addressing the "Commissioner of Patents, Washington, D. C."